(12) United States Patent
Ohta et al.

(10) Patent No.: US 7,721,610 B2
(45) Date of Patent: May 25, 2010

(54) ROTATING BODY DYNAMIC QUANTITY MEASURING DEVICE AND SYSTEM

(75) Inventors: Hiroyuki Ohta, Tsuchiura (JP); Takashi Sumigawa, Fukuoka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/245,291

(22) Filed: Oct. 3, 2008

(65) Prior Publication Data
US 2009/0031822 A1    Feb. 5, 2009

Related U.S. Application Data

(63) Continuation of application No. 11/352,210, filed on Feb. 13, 2006, now abandoned.

(30) Foreign Application Priority Data

Feb. 14, 2005    (JP) .............................. 2005-035376

(51) Int. Cl.
*G01L 1/22* (2006.01)
(52) U.S. Cl. ................................. 73/862.338
(58) Field of Classification Search ............... None
See application file for complete search history.

(56) References Cited

U.S. PATENT DOCUMENTS

| 4,782,696 | A | 11/1988 | Suchoza et al. |
| 5,931,725 | A | 8/1999 | Inaba et al. |
| 6,915,702 | B2 | 7/2005 | Omura et al. |
| 6,973,836 | B2 | 12/2005 | Katsumata et al. |
| 7,458,281 | B2 * | 12/2008 | Ohsato et al. .......... 73/862.044 |
| 2002/0050172 | A1 | 5/2002 | Toyoda et al. |
| 2004/0012253 | A1 | 1/2004 | Stephane et al. |
| 2006/0117871 | A1 | 6/2006 | Wilner |

FOREIGN PATENT DOCUMENTS

JP        06-301881        10/1994

* cited by examiner

*Primary Examiner*—Robert R Raevis
(74) *Attorney, Agent, or Firm*—Antonelli, Terry, Stout & Kraus, LLP.

(57) ABSTRACT

A single crystal semiconductor including a Wheatstone bridge circuit formed of an impurity diffusion layer whose longitudinal direction is aligned with a particular crystal orientation is connected to a rotating body. A rotating body dynamic quantity measuring device and a system using the measuring device are fatigue- and corrosion-resistant because of the single crystal semiconductor used and are not easily affected by temperature variations because of the bridge circuit considering a single crystal anisotropy.

2 Claims, 16 Drawing Sheets

ROTATING BODY DYNAMIC QUANTITY MEASURING DEVICE AND SYSTEM

CROSS-REFERENCE TO RELATED APPLICATION

This application is a Continuation application of application Ser. No. 11/352,210, filed Feb. 13, 2006 now abandoned, which claims priority from Japanese patent application JP 2005-035376, filed on Feb. 14, 2005, the contents of which are incorporated herein by reference in their entirety.

BACKGROUND OF THE INVENTION

The present invention relates to a measuring system to detect dynamic quantities of a rotating body.

Dynamic quantities of a rotating body, particularly torques, have conventionally been measured by attaching a wire strain gauge to the rotating body and measuring a change in a resistance of a fine metal wire of the gauge. However, since a thin film easily develops a high cyclic fatigue, it is difficult for the wire strain gauge to maintain reliability for a long period when used in applications that cause high cyclic deformations, such as measuring strains and torques of rotating shafts. That is, the wire strain gauge has not been able to be used in applications that affect human lives and thus require very high reliability, such as automotive drive axels. Further, in forming a Wheatstone bridge for temperature correction four wire strain gauges need to be attached and their possible peeling and damage pose a problem of a degraded reliability. Also since a metal thin film is easily corroded, the wire strain gauges could not be used for a long period under corrosive environments or environments containing water.

Further, in measuring torques of a rotating body some provisions have conventionally been made, such as picking up a detected value of the wire strain gauges through wired slipping or preparing circuits including power supply, amplifier and transmission unit and transmitting the detected value wirelessly. This, however, tends to make the device complex, large and heavy. When it is attached to a shaft, the device can easily fall because of an increased centrifugal force acting on it. Since shafts easily deflect, various corrective measures, including re-establishing a balance, need to be taken. That is, although it is possible to take time and labor to perform test measurements using the wire strain gauges, they cannot safely be used for applications that require reliability. See JP-A-6-301881 for reference.

The present invention therefore provides rotating body dynamic quantity measuring system and device capable of restraining some of the problems described above.

SUMMARY OF THE INVENTION

To solve the above problems, a rotating body dynamic quantity measuring device using a semiconductive single crystal impurity-diffused layer is placed on a rotating body.

With this invention, since a semiconductive single crystal is used, the device is not fatigued by a high cyclic load. It is therefore possible to secure a sufficient reliability for a long period of use. Further, since the device is formed of a single crystal and has no grain boundary, it is not corroded under a corrosive environment, allowing for a highly reliable measurement.

Further, since the rotating body dynamic quantity measuring device using a single crystal semiconductor is very small and light in weight, if it is attached to a rotating body, it is subjected to only a small centrifugal force resulting from its own mass and thus requires no special high-strength jointing method, which in turn improves reliability. The single crystal semiconductor in particular can be manufactured into a very small size with high precision by using the semiconductor manufacturing technique. Therefore, there is no need for a process to re-establish a shaft balance after the measuring device is mounted.

As for details of this invention, the following descriptions mainly concern an example case in which a silicon single crystal is used. It is noted, however, that any semiconductor crystal can be similarly applied as long as it has a diamond structure.

This invention can provide a rotating body dynamic quantity measuring device and a rotating body dynamic quantity measuring system capable of contributing to solving some of the above problems.

Other objects, features and advantages of the invention will become apparent from the following description of the embodiments of the invention taken in conjunction with the accompanying drawings.

DESCRIPTION OF THE EMBODIMENTS

Now, embodiments of this invention will be described in detail by referring to the accompanying drawings.

Embodiment 1

Figure 1:
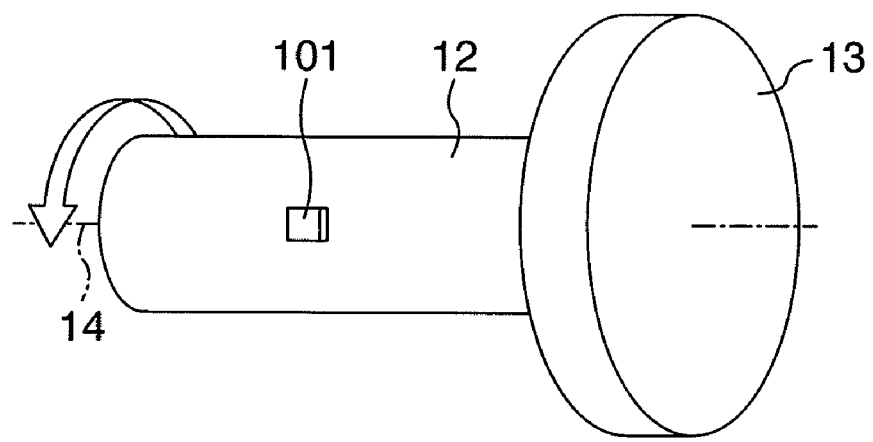
FIG. 1 is a schematic view of a measuring system as one embodiment of this invention.

FIG. 1 shows a construction of a rotating body dynamic quantity measuring system in a first embodiment of this invention. A rotating body dynamic quantity measuring device 101 is installed on a surface of a rotating shaft 12 to measure a torque of the rotating shaft 12 as the shaft 12 rotates about a rotating center 14. The rotating body dynamic quantity measuring device is formed of a single crystal silicon shaped like a square chip which measures several hundred microns to several millimeters in one side and ten microns to several hundred microns in thickness. A back of an element forming surface or a diffusion layer is bonded to the rotating shaft 12 to measure its strains. Normally, in measuring the torque of the rotating shaft, a strain gauge formed of a metal foil is used. However, the metal foil used in the strain gauge has a short fatigue life. So when attached to a rotating shaft that undergoes high cycle deformations, the metal foil cannot withstand a long period of use. A semiconductor, represented by silicon, has a significantly large yield strength compared with that of common metal foil strain gauges and thus, when subjected to the same deformation, produces only small plastic deformations, exhibiting a significantly long fatigue life for high cycle deformations. The semiconductor therefore has an advantage of being able to perform the torque measurement stably for a long period. Among strain sensors using a semiconductor there are those using a polycrystalline silicon. The polycrystalline silicon has many crystal grain boundaries therein at which environmental corrosions easily occur, degrading the measurement accuracy and causing wire breaks. When a single crystal semiconductor is used for the rotating body dynamic quantity measuring device, since it contains no grain boundary, the effects of environmental corrosions at grain boundaries can be eliminated, assuring an excellent reliability over a long period of use. As the single crystal semiconductor, a single crystal silicon is most desirable because of its advantages of good matching with other electric circuits, a large destructive strength and low cost.

Figure 2:
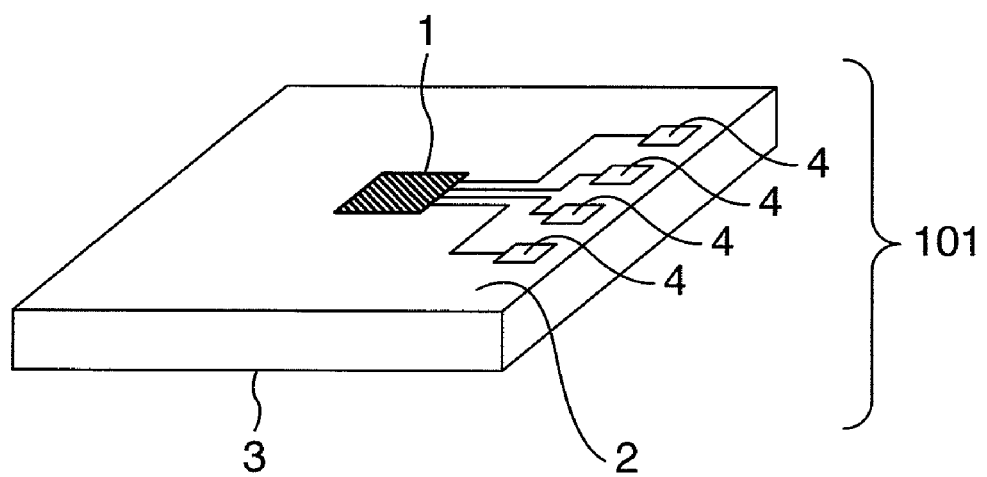
FIG. 2 is a schematic view of a rotating body dynamic quantity measuring device in the embodiment of this invention.
Figure 3:
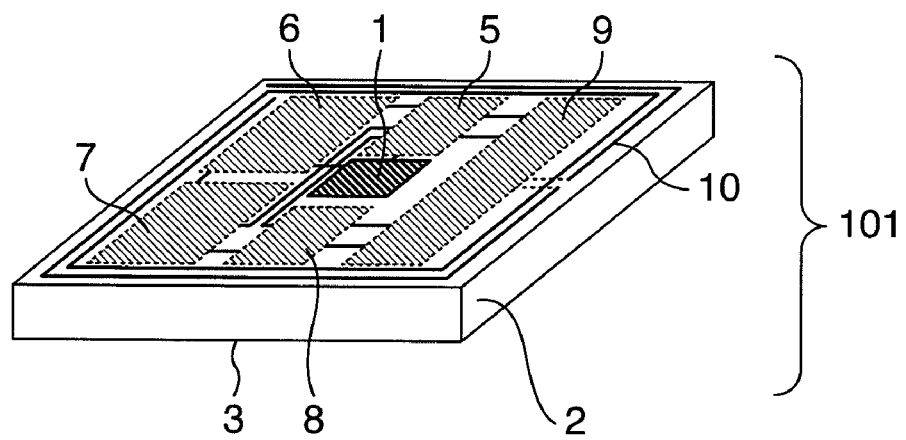
FIG. 3 is a schematic view of the measuring system in the embodiment of this invention.
Figure 4:
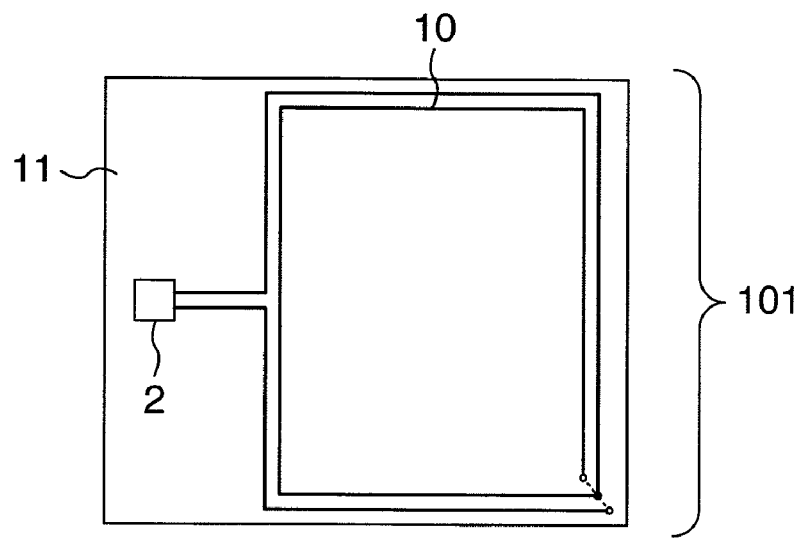
FIG. 4 is a schematic view of the rotating body dynamic quantity measuring device in the embodiment of this invention.
Figure 5:
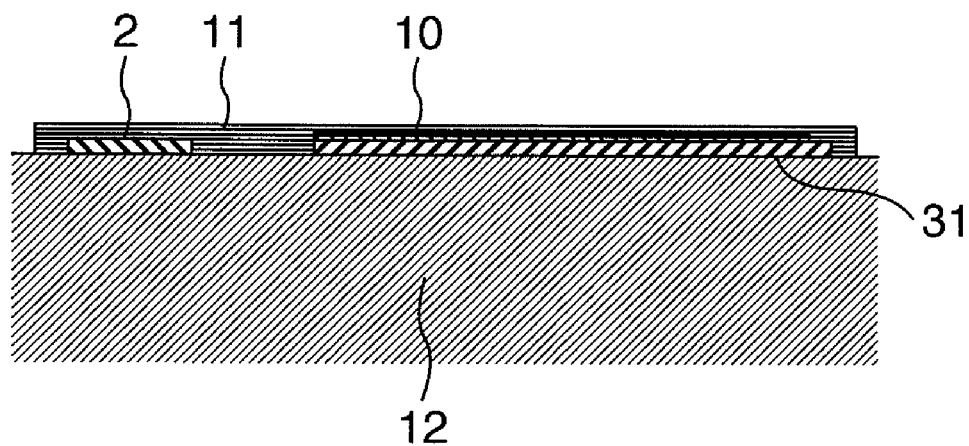
FIG. 5 is a schematic view of the measuring system in the embodiment of this invention.

The rotating shaft with a torque measuring function is characterized in that a single crystal semiconductor chip is used for a torque measuring sensor and that an impurity diffusion layer that constitutes a torque measuring element is formed on a silicon substrate 2. FIG. 2 shows the rotating body dynamic quantity measuring device 101 of this invention. Here is shown an example case where a single crystal silicon substrate 2 is used as the single crystal semiconductor substrate. On the single crystal semiconductor substrate 2 constituting the rotating body dynamic quantity measuring device 101, there is formed a torque sensor 1 that utilizes at least a piezoresistive effect. A back of the substrate, opposite the face where the torque sensor 1 is formed, constitutes a bonding surface 3 attached to the rotating shaft 12. The bonding surface 3 and the rotating shaft 12 are preferably bonded together using an adhesive. But they may be held together by jointing or fitting. Although the bonding is preferably done over the entire back surface, a part of the back surface, such as chip ends, may be left unbonded and still the similar effect can be produced though with a slightly increased measuring error. While in this embodiment the back surface opposite the element forming surface is made a bonding surface, it is also possible to use the element forming surface for bonding. In that case the measuring accuracy improves because the element forming surface is closer to the rotating shaft 12. The rotating body dynamic quantity measuring device 101 may comprise, as shown in FIG. 1, a torque sensor 1 and pads 4 wired to the torque sensor 1 on the silicon substrate 2, or may comprise, as shown in FIG. 3, a power supply 5, an amplifier 6, an A/D converter, an analog circuit 8, a communication control unit 9 and an antenna 10 and perform information transfer to and from the outside circuit wirelessly. In this case, the power supply 5 may be a battery or self-generate using electromagnetic waves. The wireless communication with the external circuits eliminates the need for wiring to and from the outside and thus enables the measurement of rotating body dynamic quantities to be performed without interfering with the rotating body motion. In the case where the rotating body dynamic quantity measuring device 101 of FIG. 3 operates its circuit by using electromagnetic wave energy from outside, there is no need to provide a separate power supply unit, substantially reducing its weight, giving rise to an advantage that when the measuring device is mounted to the rotating shaft 12, a rotation balance will not be destroyed. Further, in the rotating body dynamic quantity measuring device 101 shown in FIG. 3, if an energy storage unit such as a battery is provided, a large instantaneous power can be produced, allowing the communication distance to be increased. The antenna 10 may be installed on the silicon substrate 2 or, as shown in FIG. 4, outside the silicon substrate 2. When the antenna is installed outside, an area enclosed by the antenna can be increased, making it possible to increase the communication distance. Further, as shown in FIG. 5, a highly permeable sheet 31 is placed between the antenna 10 and the rotating shaft 12 to allow for communication with outside even if the rotating shaft 12 is a metal. In this case, since the highly permeable sheet 31 is not interposed between the silicon substrate 2 and the rotating shaft 12, the silicon substrate 2 is directly attached to the rotating shaft 12 allowing for a highly precise torque measurement. As described above, different configurations—one with the torque sensor placed on the silicon substrate, one with the torque sensor, power supply 5, amplifier 6, A/D converter, analog circuit 8, communication control unit 9 and antenna 10 installed on the silicon substrate, and one with the torque sensor 1, power supply 5, amplifier 6, A/D converter, analog circuit 8 and communication control unit 9 installed on the silicon substrate and with the antenna 10 installed outside—have different advantages. These are treated as the rotating body dynamic quantity measuring device 101 in the following descriptions of this invention.

Figure 6:
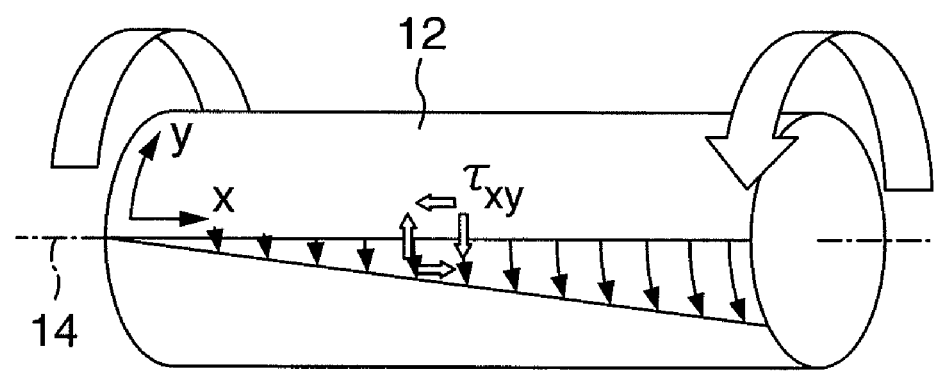
FIG. 6 is a schematic diagram showing a working principle for torque measurement.

When a torque is produced in a rotating shaft, a difference in rotating degree occurs between the shaft ends, creating a shearing stress $\tau$ in the shaft, as shown in FIG. 6. Thus, the torque produced in the rotating shaft can be measured by detecting the shearing stress $\tau$.

Figure 7:
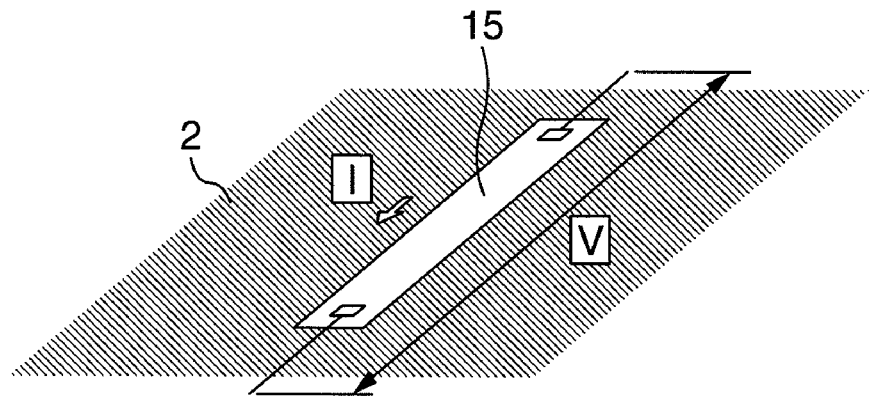
FIG. 7 is a schematic diagram showing an impurity diffusion layer.
Figure 8:
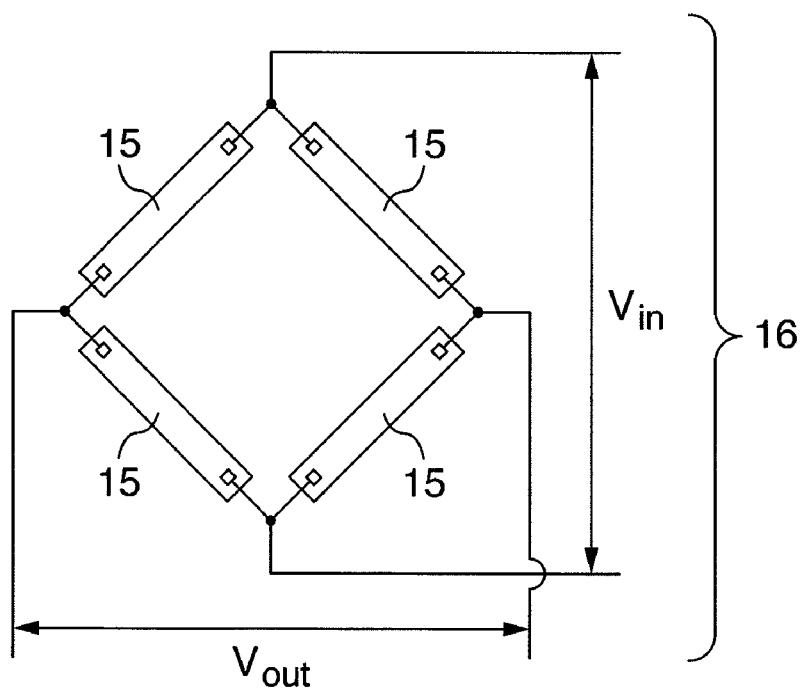
FIG. 8 is a schematic diagram showing a Wheatstone bridge circuit.

Silicon has a phenomenon called a piezoresistive effect in which a resistance of the silicon changes when subjected to stresses. Silicon has a significantly large resistance and thus, as shown in FIG. 7, a stress can be measured by doping the silicon with impurities to form an impurity diffused layer, applying a voltage in its longitudinal direction, and measuring a change in electric current when a stress is produced. Further, since the resistance of the impurity diffusion layer is strongly influenced by temperature variations, a temperature variation correction circuit is required. Normally, in measuring strains using a strain gauge, a Wheatstone bridge circuit shown in FIG. 8 is used as a temperature compensation circuit. In that case, the Wheatstone bridge circuit is usually constructed of an active resistor sensitive to the strains and a dummy resistor insensitive to the strains, with the active resistor installed on a strain measuring point and the dummy resistor at an isolated point where it is not affected by the strains.

However, if the Wheatstone bridge circuit is used in the rotating body dynamic quantity measuring device 101 of this invention, all the resistors must be arranged on the silicon substrate 2, in which case all the resistors are subjected to strains, making it impossible for the bridge circuit to perform its function correctly. In the case of the metal foil strain gauge, a resistance change results from a change in cross section of the resistor caused by a strain, so the strain gauge has a sensitivity only in the longitudinal direction of the resistor. However, in the case of the piezoresistive effect of silicon, a specific resistance changes when the resistor is strained and its magnitude is greater than the resistance change caused by the change in cross-sectional area of the resistor. This means that the strain gauge has a large sensitivity in other than the longitudinal direction. That is, because the strain sensitivity cannot be canceled by using the resistor geometry, a problem remains.

Figure 9:
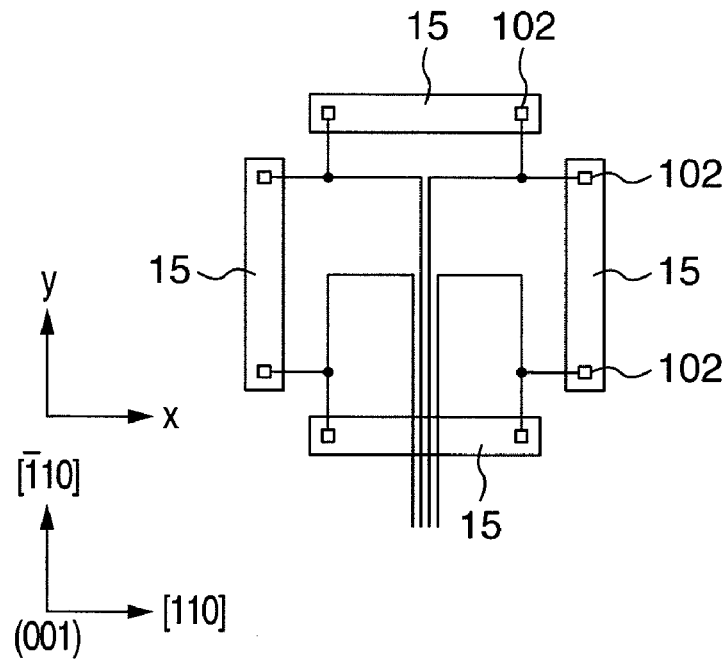
FIG. 9 is a schematic diagram showing a relation among a dispersion layer arrangement in the rotating body dynamic quantity measuring device, a crystal axis orientation and coordinate axes in the embodiment of this invention.
Figure 15:
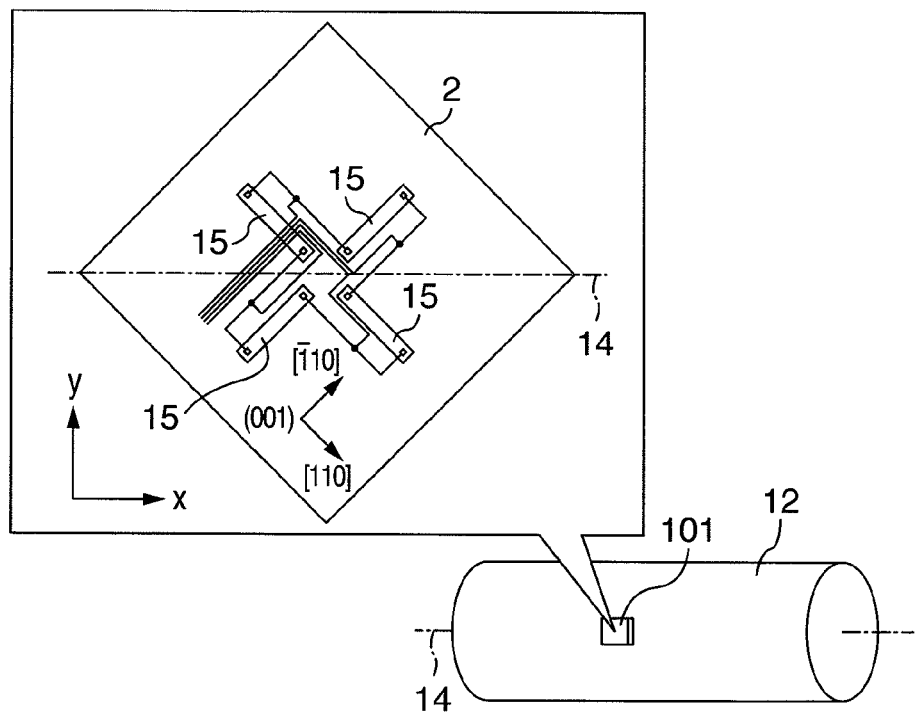
FIG. 15 is a schematic diagram showing how the rotating body dynamic quantity measuring device is bonded according to the diffusion layer arrangement in the embodiment of this invention.
Figure 16:
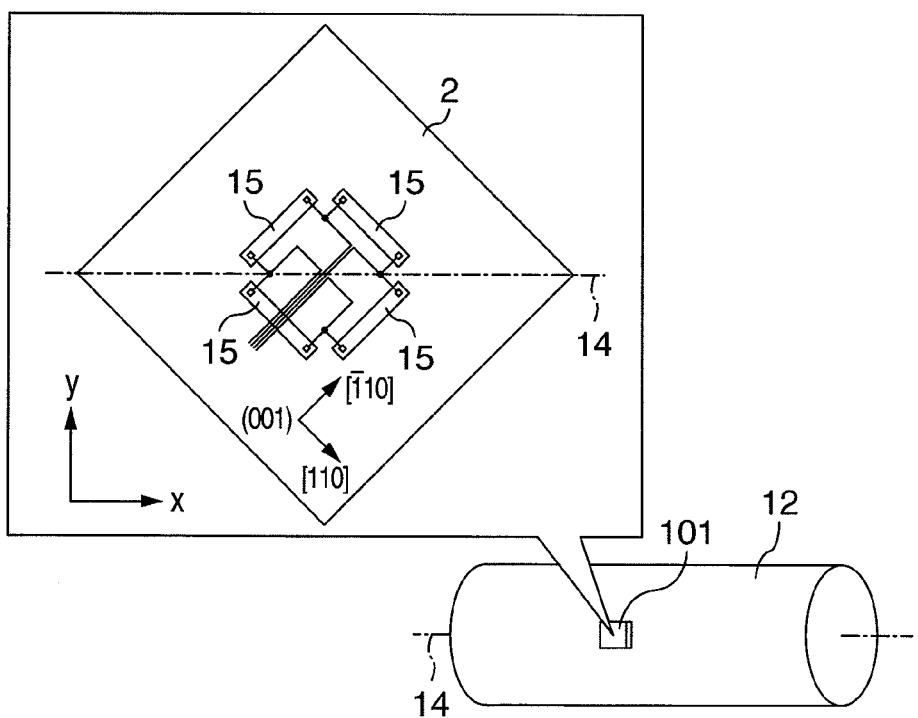
FIG. 16 is a schematic diagram showing how the rotating body dynamic quantity measuring device is bonded according to the diffusion layer arrangement in the embodiment of this invention.

The construction of a bridge circuit of this invention that can solve this problem is shown in FIG. 9. FIG. 9 represents the bridge circuit using four resistors of p-type diffusion. The Wheatstone bridge circuit, as described earlier, is required to have an active resistor sensitive to a dynamic quantity to be measured and a dummy resistor with no sensitivity or which produces an output opposite in sign to that of the active resistor. That is, the bridge circuit requires an output difference between the active resistor and the dummy resistor. The larger the output resistance, the greater the sensitivity of the output of the bridge circuit. As described earlier, silicon has a so-called piezoresistive effect in which a natural resistance changes when the silicon is subjected to strains. Further, in the case of a single crystal silicon, the piezoresistive effect has an orthogonal anisotropy that depends on the crystal orientation. That is, by changing a relationship among the silicon crystal orientation, the arrangement of diffused resistors and a coordinate system that functions as a reference for strains, the resistance change with respect to strains can be manipulated. In FIG. 9, of the four resistors of p-type impurity diffusion layer making up the Wheatstone bridge circuit, one pair of opposing resistors is arranged so that its longitudinal direction lies in a [−110] direction of the single crystal silicon and the other pair is arranged so that its longitudinal direction lies in a [110] direction, rotated 90 degrees from the [−110] direction. That is, the Wheatstone bridge circuit is so constructed that lines connecting the ends 102 of each of half the resistors making up the Wheatstone bridge circuit lie nearly in the same direction as a <110> direction of the single crystal semiconductor but almost perpendicular to those lines connecting the ends of each of the remaining half of the resistors making up the Wheatstone bridge circuit. Although the first half of the resistors are preferably set almost rectangular to the remaining half, the similar effect can be produced as long as the two groups of resistors intersect each other at an angle of between 45 degrees and 135 degrees. Further, as shown in FIG. 16, a reference coordinate system for strain is arranged so that its xy coordinate axes, perpendicular to and parallel to the rotating axis, are in a direction almost 45 degrees in rotation from the [−110] direction of the silicon crystal. While the side of the chip is depicted in FIG. 16 to be parallel to the <110>, if the direction of the diffusion resistor is <110>, the side of the chip may be set parallel to <100>. In the embodiments of FIG. 15 and FIG. 16, the diffusion resistors parallel to the [−110] direction have a large sensitivity to the shearing strain $\tau_{xy}$ but almost none for other strains.

Figure 10:
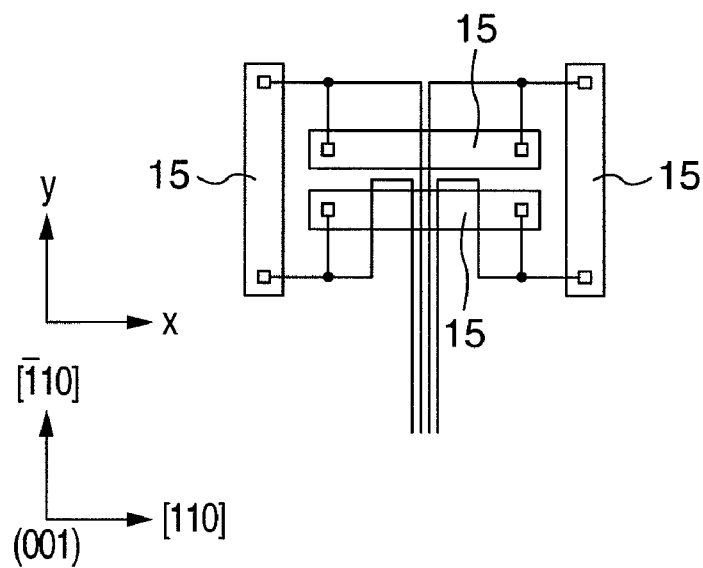
FIG. 10 is a schematic diagram showing another relation among a dispersion layer arrangement in the rotating body dynamic quantity measuring device, a crystal axis orientation and coordinate axes in the embodiment of this invention.
Figure 11:
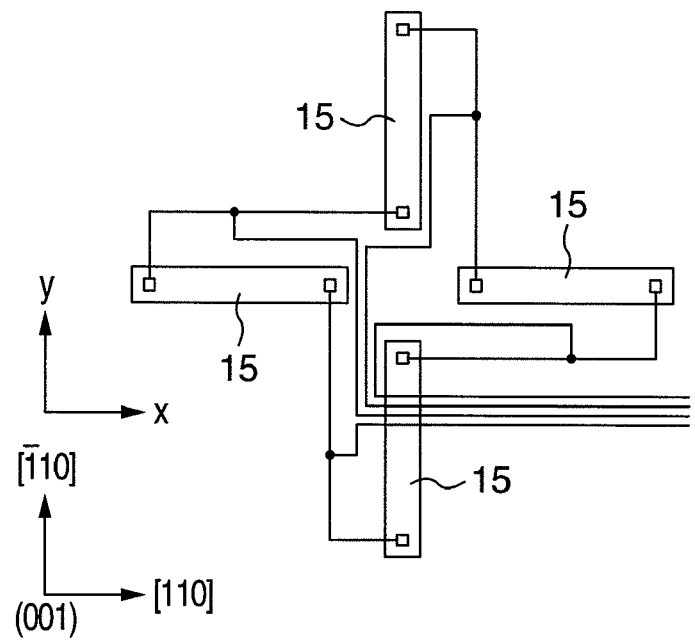
FIG. 11 is a schematic diagram showing still another relation among a dispersion layer arrangement in the rotating body dynamic quantity measuring device, a crystal axis orientation and coordinate axes in the embodiment of this invention.

The resistors parallel to the [110] direction have a large sensitivity for only $\tau_{xy}$ and produce an output opposite in sign to that of the resistors oriented in the [−110] direction. That is, the building the Wheatstone bridge circuit in the arrangement of FIG. 9 offers an advantage of being able to measure only the shearing strain $\tau_{xy}$ with four times the sensitivity. In a strain gauge using metal fine wires, if there are stresses other than $\tau_{xy}$, their influences result in resistance changes. In the rotating body dynamic quantity measuring device 101, their influences are very small, assuring a highly precise measurement of torque. This advantage, too, is obtained because the rotating body dynamic quantity measuring device 101 is formed of a single crystal silicon and is bonded considering the crystal axis orientation. By arranging this bridge circuit so that the bridge circuit is symmetrical about its center four times on the silicon substrate, as shown in FIG. 9 and FIG. 11, the relationship between the adjoining resistors can be made equal for all of the four resistors. In forming a diffusion layer of an arbitrary geometry on silicon, etching is used to form that geometry on the mask. To make four resistances equal requires forming the same geometries on the mask for all the resistors to be formed. During an etching process the density of etching gas on the mask changes depending on the surrounding environment, greatly affecting the accuracy of the geometry of the resistors being formed. By forming the diffused resistors in the layout of FIG. 9 and FIG. 11, the influences of the surrounding environment to which all the four resistors are subjected can be made equal, so the mask for the four resistors can be etched in the same geometry. Therefore, when the impurity diffusion layer is formed, it is possible to make the resistances of the four resistors equal, reduce an offset of the Wheatstone bridge circuit and thereby assure a highly precise measurement of strains. Another arrangement in which, as shown in FIG. 10, two resistors are interposed between the other opposing resistors, offers an advantage of being able to reduce an area occupied by the bridge circuit in a case where an area in which to arrange the bridge circuit is limited, as when the silicon substrate 2 is made as small as possible to manufacture a infinitesimally small, rotating body dynamic quantity measuring device 101 or when other circuits such as a wireless communication circuit are also mounted on the silicon substrate 2 as described above.

Figure 12:
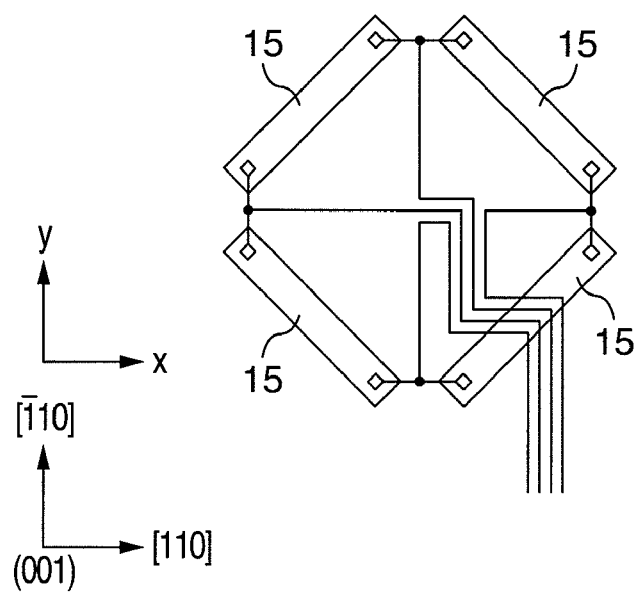
FIG. 12 is a schematic diagram showing a further relation among a dispersion layer arrangement in the rotating body dynamic quantity measuring device, a crystal axis orientation and coordinate axes in the embodiment of this invention.
Figure 13:
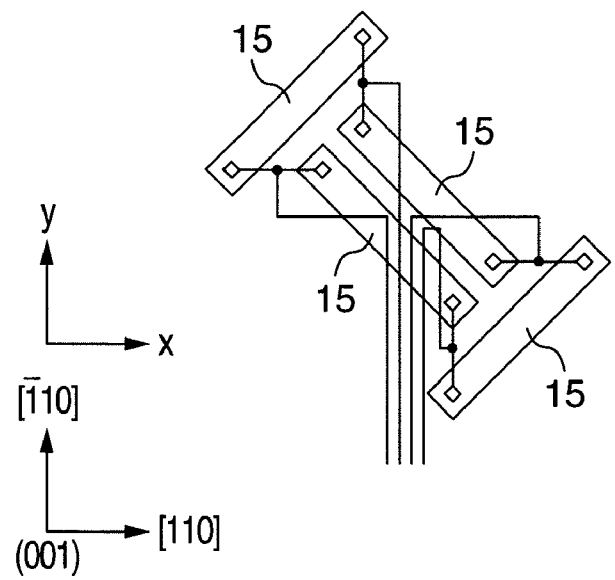
FIG. 13 is a schematic diagram showing a further relation among a dispersion layer arrangement in the rotating body dynamic quantity measuring device, a crystal axis orientation and coordinate axes in the embodiment of this invention.
Figure 14:
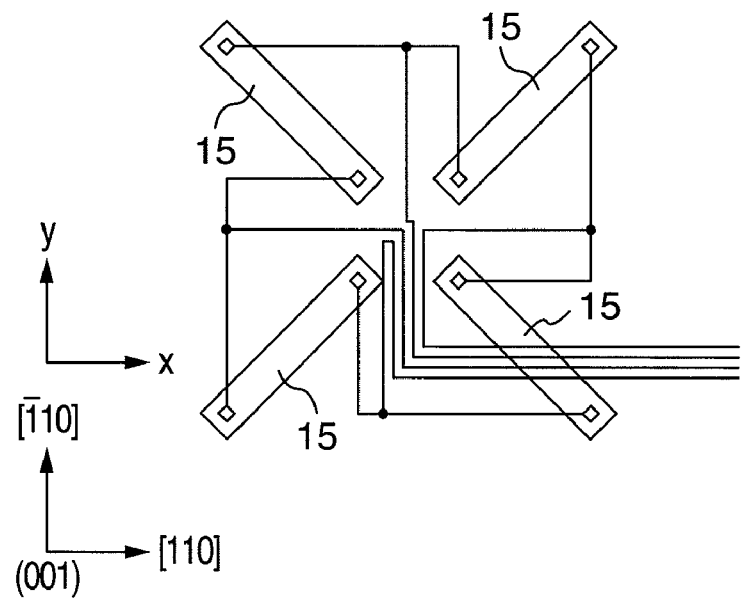
FIG. 14 is a schematic diagram showing a further relation among a dispersion layer arrangement in the rotating body dynamic quantity measuring device, a crystal axis orientation and coordinate axes in the embodiment of this invention.
Figure 17:
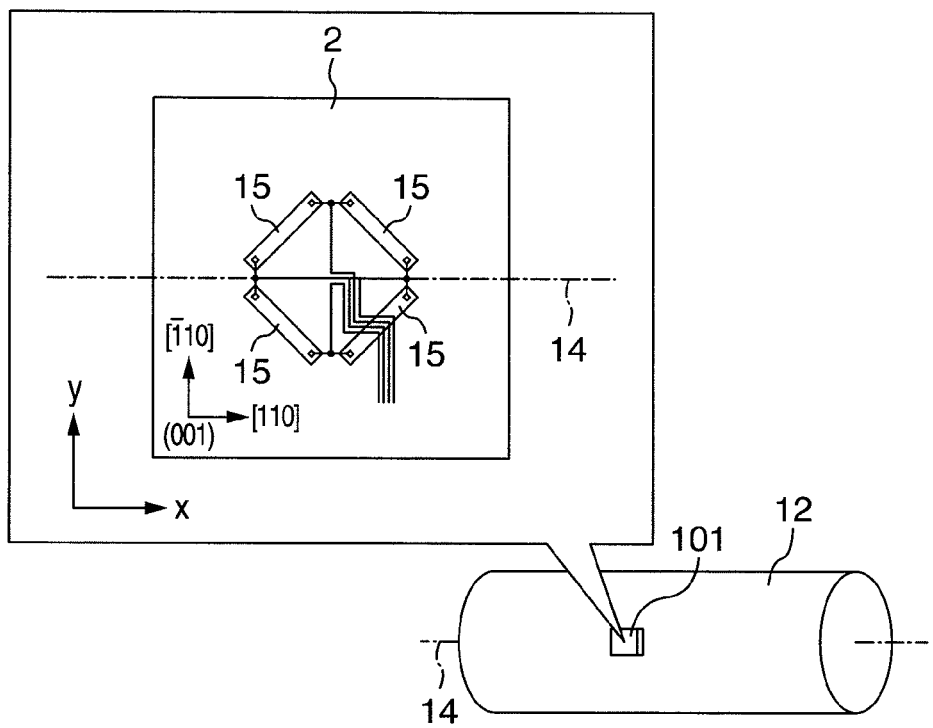
FIG. 17 is a schematic diagram showing how the rotating body dynamic quantity measuring device is bonded according to the diffusion layer arrangement in the embodiment of this invention.
Figure 18:
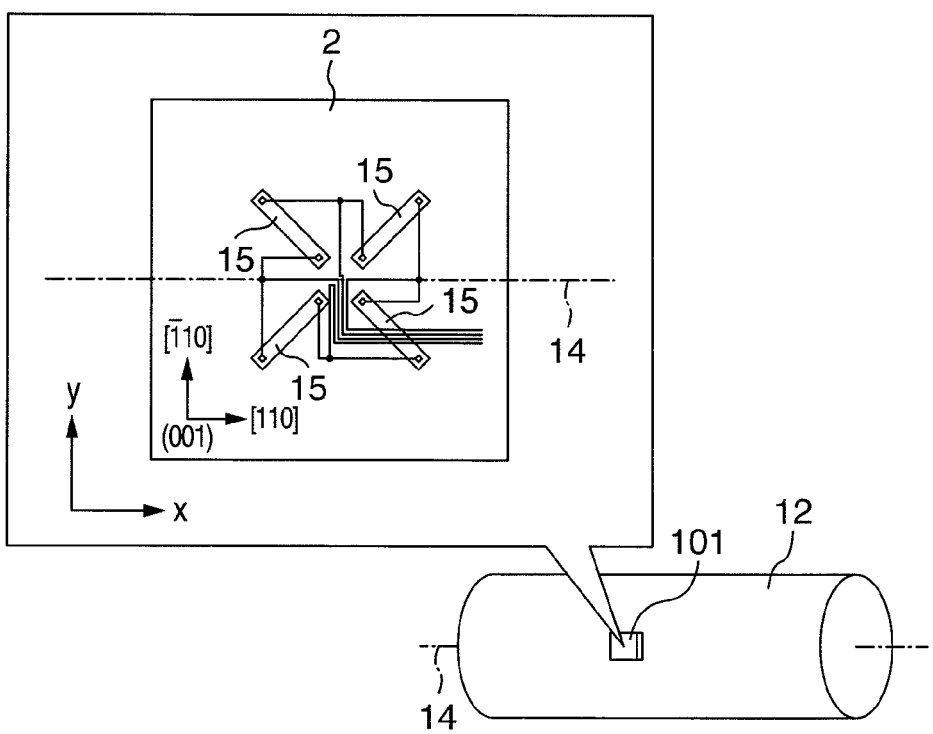
FIG. 18 is a schematic diagram showing how the rotating body dynamic quantity measuring device is bonded according to the diffusion layer arrangement in the embodiment of this invention.
Figure 19:
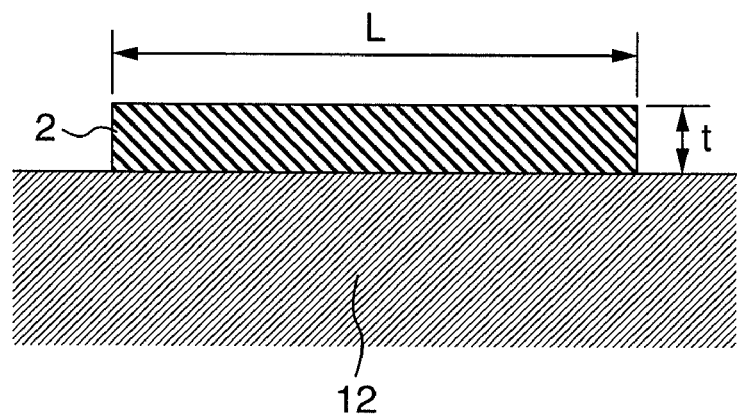
FIG. 19 is a schematic diagram showing a relation between an outline geometry of a single crystal silicon and a sensitivity in this invention.
Figure 20:
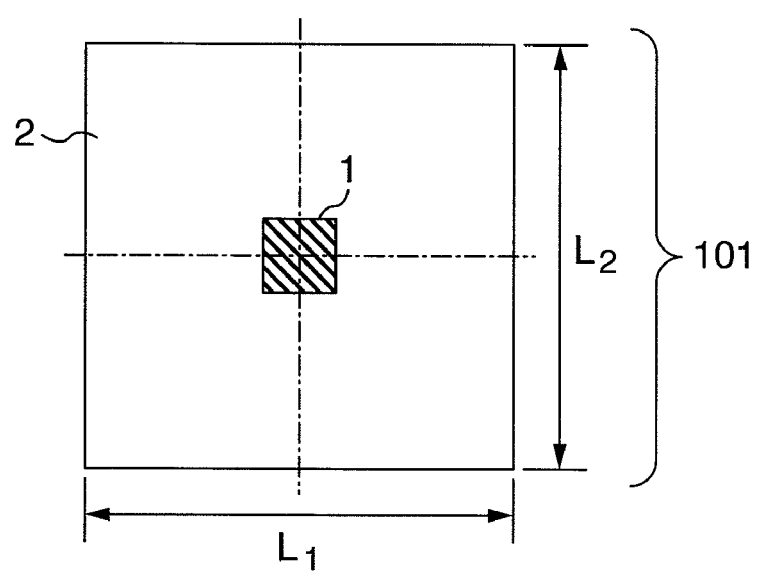
FIG. 20 is a schematic diagram showing a relation between an outline geometry of the single crystal silicon and a sensitivity in this invention.

Although an example case of p-type diffusion layer has been taken up to explain the method of its arrangement, the similar effect can be produced if the diffusion layer is an n-type. The rotating body dynamic quantity measuring device 101 using the n-type diffusion layer has an advantage of a high sensitivity. When the resistors making up the bridge circuit is an n-type diffusion layer, a pair of opposing resistors is so arranged that, as shown in FIG. 12, its longitudinal direction lies in the [100] direction of the silicon single crystal and the remaining pair of resistors is so arranged that its longitudinal direction lies in [010] direction, which is 90 degrees in rotation from the [100] direction. That is, the resistors are arranged so that lines connecting the ends of each of half the resistors making up the Wheatstone bridge circuit lie nearly in the same direction as a <100> direction of the single crystal semiconductor but almost perpendicular to those lines connecting the ends of each of the remaining half of the resistors making up the Wheatstone bridge circuit. Although the first half of the resistors are preferably set almost rectangular to the remaining half, the similar effect can be produced as long as the two groups of resistors intersect each other at an angle of between 45 degrees and 135 degrees. Further, as shown in FIG. 17 and FIG. 18, the reference coordinate system for strains is arranged so that its xy coordinate axes, perpendicular to and parallel to the rotating axis, lie in a direction almost 45 degrees in rotation from the crystal orientation of [100]. In FIG. 17 and FIG. 18, although the sides of the chip are shown to be parallel to <110>, if the direction of the diffusion resistors is <100>, the sides of the chip may be set parallel to <100>. In that case, since the elements other than the diffusion layer can be formed parallel to and perpendicular to <100>, they are not easily affected by the strains. In the embodiment of FIG. 17, the resistors parallel to the [100] direction have a high sensitivity for the shearing strain $\tau_{xy}$ but almost none for other strains. The resistors parallel to the [010] direction also have a high sensitivity for only the shearing strain $\tau_{xy}$ but produce an output opposite in sign to the output of the resistors arranged in the [100] direction. That is, by forming a Wheatstone bridge circuit in the arrangement of FIG. 9, a sensor can be manufactured that can measure only the shearing strain $\tau_{xy}$ with high precision. In the case of n-type diffusion layer, too, variations of the resistor geometries during the mask fabrication can be eliminated by arranging the four resistors so that the 4-time symmetric axis of the bridge circuit lies at their center, as shown in FIG. 12 and FIG. 14, as in the case of p-type diffusion layer. This in turn reduces an offset of the bridge circuit. Further, when the resistors are arranged as shown in FIG. 13, there is an advantage that the area occupied by the bridge circuit can be reduced.

In the above arrangement of the impurity diffusion layer that works as resistors, the description that the longitudinal direction lies in the [100] direction means that the direction of a line connecting two via electrodes connected to the resistor lies close to the [100] direction and that, when viewed macroscopically, the [100] direction matches the longitudinal direction. In the path connecting the two via electrodes, the geometry of the diffusion layer may be formed zigzag to increase its resistance. This applies to both of the n-type impurity and p-type impurity.

Although the rotating body dynamic quantity measuring device described above resembles the prior art used in pressure sensors when we look at only the crystal orientation with respect to the longitudinal direction of the diffusion layer, its construction and working principle differ entirely from those of the prior art. In the pressure sensor, a hole is formed in a silicon substrate to form a diaphragm and a deformation of the diaphragm when subjected to a pressure is detected by a strain sensor formed on the surface of the silicon substrate. That is, local deformations of the diaphragm due to pressure are detected by two of the four diffusion layer resistors making up the Wheatstone bridge circuit. The other two diffusion layer resistors are used as dummies and arranged at a location and in a direction where they are not easily affected by the deformation of the diaphragm. In this rotating body dynamic quantity measuring device, however, since the strain fields to which the four diffusion layer resistors in the silicon substrate are subjected are theoretically the same, it is difficult to manufacture dummy diffusion layer resistors by utilizing a difference in local deformation as in the pressure sensor. The inventors of this invention have found that the above arrangement can extract only a shearing stress well only when measuring a torque of a rotating shaft. This has led us to this invention. In the case of this invention, unlike the pressure sensor, it is desired that a uniform strain field be generated in the silicon substrate. Thus, if there is a hole larger in width than the shorter side of the diffusion layer, as in the pressure sensor, in the back of the silicon substrate which is opposite the element forming surface of the silicon substrate and which is directly or indirectly placed in contact with an object to be measured, complex strain fields are generated in the silicon substrate, which is not desirable. Small undulations or holes in the back of the silicon substrate may be conducive to an improvement in the adhesion between the object and the measuring device, but any hole greater in depth than half the thickness of the silicon substrate will cause complicated strain fields in the silicon substrate. This is not desirable.

Embodiment 2

Figure 21:
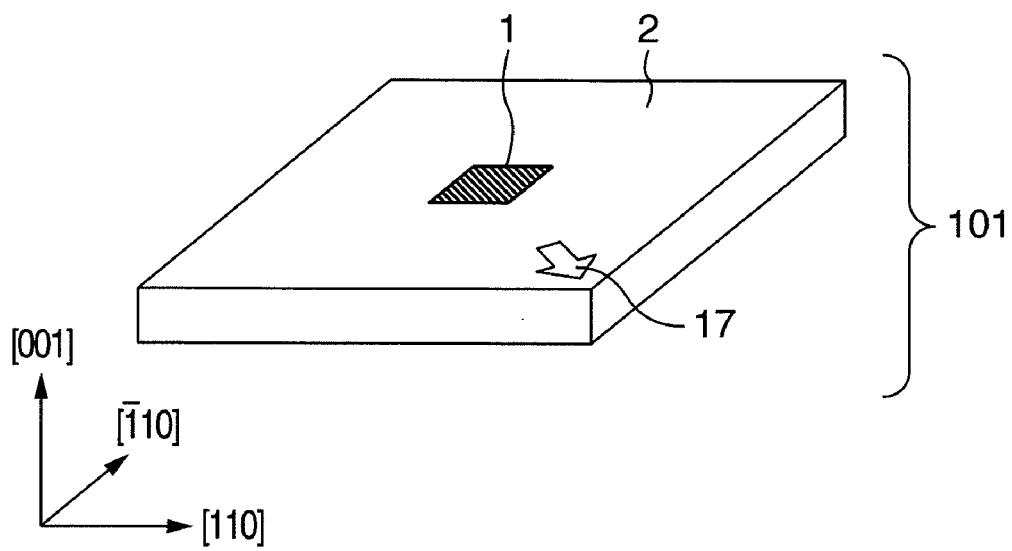
FIG. 21 is a schematic view showing an example of marking formed on the single crystal silicon in this invention.
Figure 22:
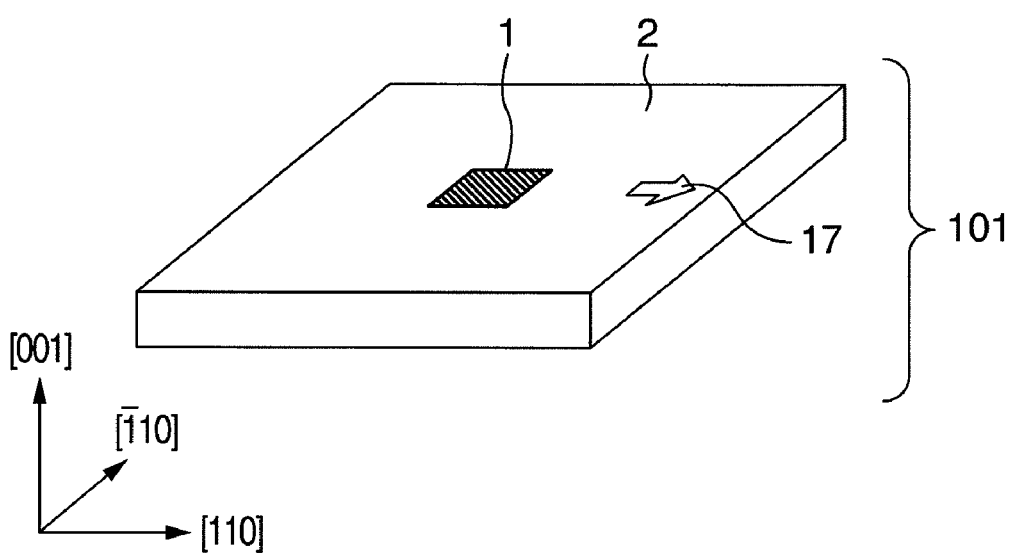
FIG. 22 is a schematic view showing another example of marking formed on the single crystal silicon in this invention.
Figure 23:
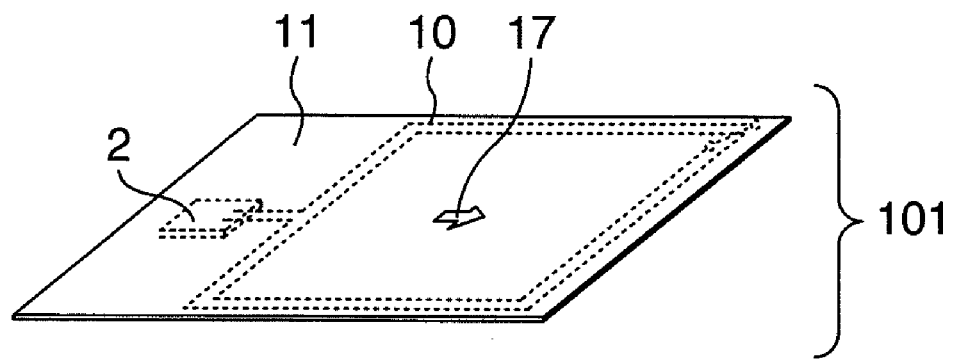
FIG. 23 is a schematic view showing an example of marking formed on the rotating body dynamic quantity measuring device of this invention.
Figure 24:
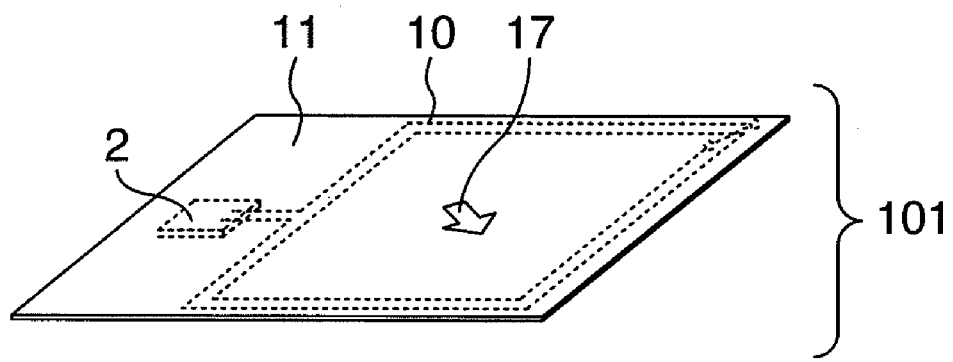
FIG. 24 is a schematic view showing another example of marking formed on the rotating body dynamic quantity measuring device of this invention.

The rotating body dynamic quantity measuring device 101 of this invention is manufactured by forming minute, thin film structures several microns in size on the silicon substrate several millimeters square using the semiconductor fabrication process. So it is difficult to visually identify the diffusion layer in the rotating body dynamic quantity measuring device 101. The sensor of this invention considers the direction in which a strain is measured, the crystal orientation, and the direction in which the impurity diffused resistors are arranged. Therefore, what matters in the site of actual use of the rotating body dynamic quantity measuring device 101 is how the device is arranged with respect to the direction in which a strain is to be taken. So, as shown in FIG. 21, a mark 17 is formed in the rotating body dynamic quantity measuring device 101. FIG. 21 shows a rotating body dynamic quantity measuring device using a bridge circuit of a p-type diffusion layer on which an arrow is marked indicating an axial direction of the shaft. The user can make a correct measurement of a torque generated in the rotating shaft by arranging the rotating body dynamic quantity measuring device so that its arrow is parallel to the center axis of the rotating shaft. The arrow marking 17 may be formed of thin film or marked with ink or paint. The marking may also be dots or line as well as arrow. FIG. 22 shows an example case in which the rotating body dynamic quantity measuring device is manufactured using an n-type impurity diffusion layer. In the figure an arrow 17 is marked which is parallel to the direction of sides of the silicon substrate 2. The user can take accurate measurements of torque by arranging the rotating body dynamic quantity measuring device so that the arrow marking on the device is parallel to the central axis of the rotating body. As shown in FIG. 23 and FIG. 24, the arrow representing a direction may be marked on an antenna support portion 11, such as a film, that supports the antenna, rather than on the chip.

Embodiment 3

Figure 25:
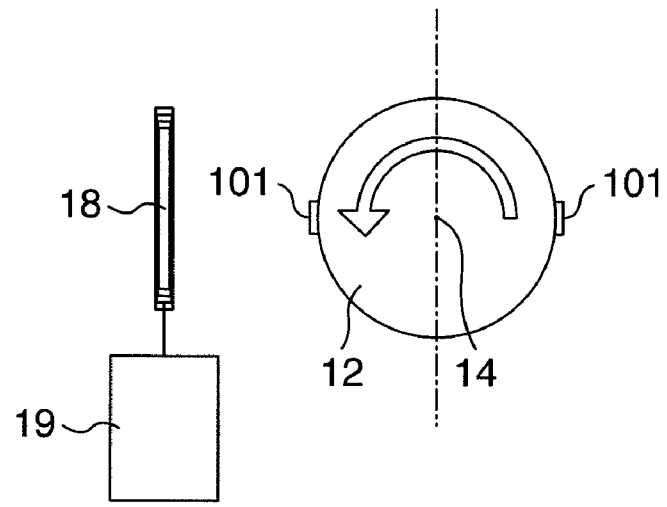
FIG. 25 is a schematic view showing a measuring system as one embodiment of this invention.

FIG. 25 shows a third embodiment of the rotating body dynamic quantity measuring system according to this invention. FIG. 25 schematically shows the rotating shaft 12 as seen from the end, on the circumferential surface of which is attached a plurality of rotating body dynamic quantity measuring devices 101 with a wireless communication function. Radio waves transmitted from the rotating body dynamic quantity measuring devices 101 are received by a receiving antenna 18 and converted by a receiving unit 19 into strain and torque values. When the rotating shaft 12 is formed of a conductive body such as metal, radio waves do not easily travel to the far side of the shaft. To cope with this problem, this embodiment has a plurality of rotating body dynamic quantity measuring devices 101 attached to the circumferential surface of the rotating shaft to enable measurement at all times. This embodiment offers an advantage that there is no area where strain measurements cannot be taken because of the inability to receive radio waves.

Figure 26:
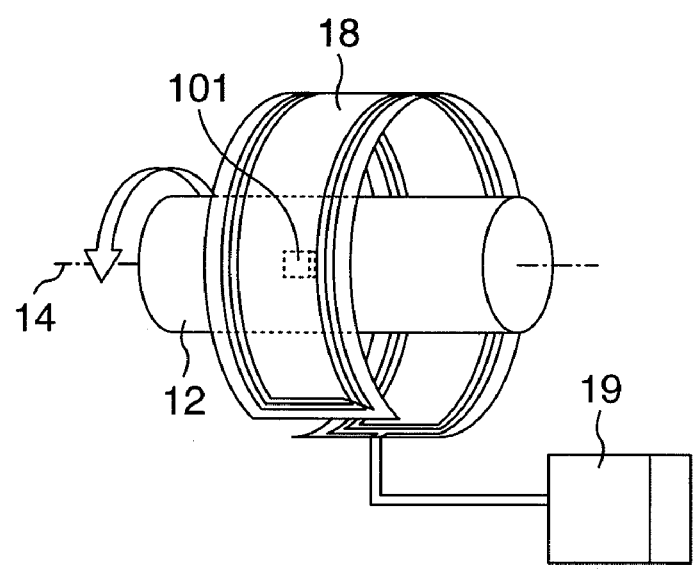
FIG. 26 is a schematic view showing a measuring system as another embodiment of this invention.
Figure 27:
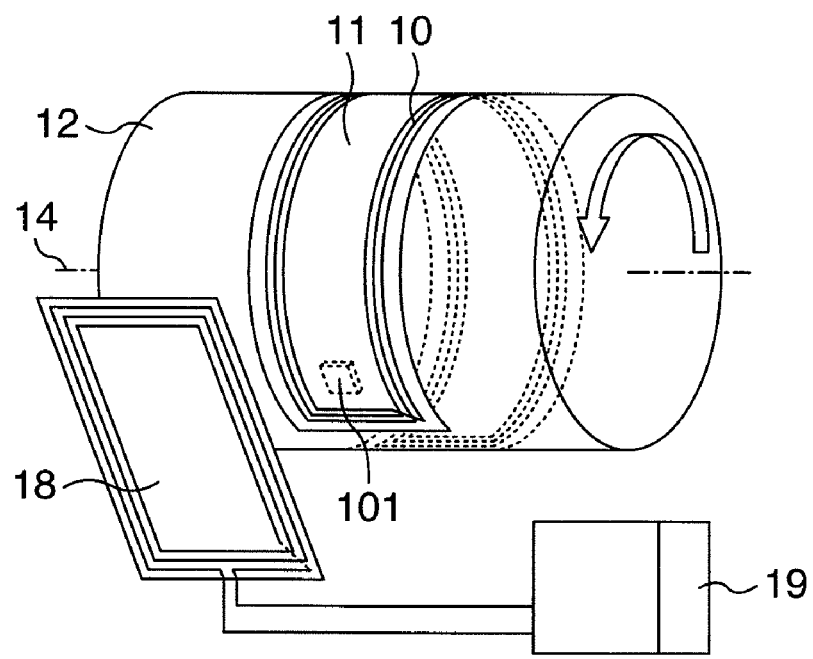
FIG. 27 is a schematic view showing a measuring system as a further embodiment of this invention.
Figure 28:
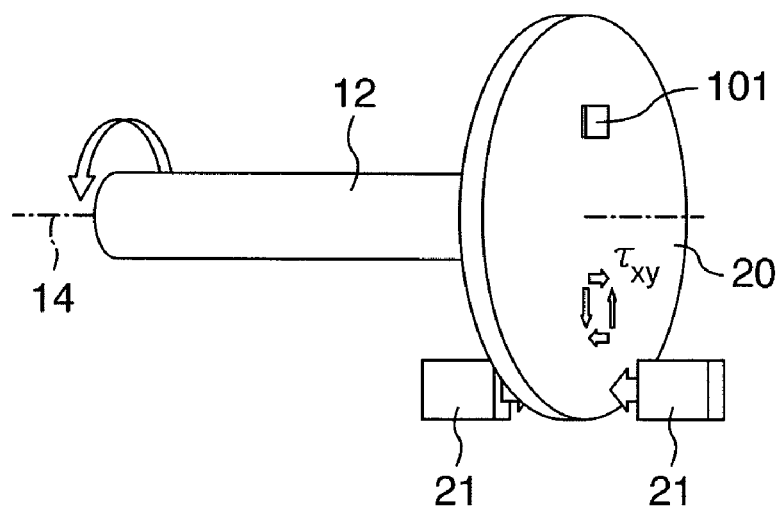
FIG. 28 is a schematic view showing a measuring system as a further embodiment of this invention.

FIG. 26 shows another rotating body dynamic quantity measuring system according to this invention. This embodiment is characterized in that the receiving antenna 18 encircles the rotating shaft 12. The radio waves from the rotating body dynamic quantity measuring device 101 can be received by the receiving antenna 18 no matter where the measuring device 101 is located. This embodiment offers an advantage that there is no area where strain measurements cannot be taken because of the inability to receive radio waves. As shown in FIG. 27, the antenna 10 of the measuring device 101 may also be attached to the entire circumferential surface of the rotating shaft 12. In that case, there is an advantage of facilitating the mounting of the receiving antenna.

Figure 29:
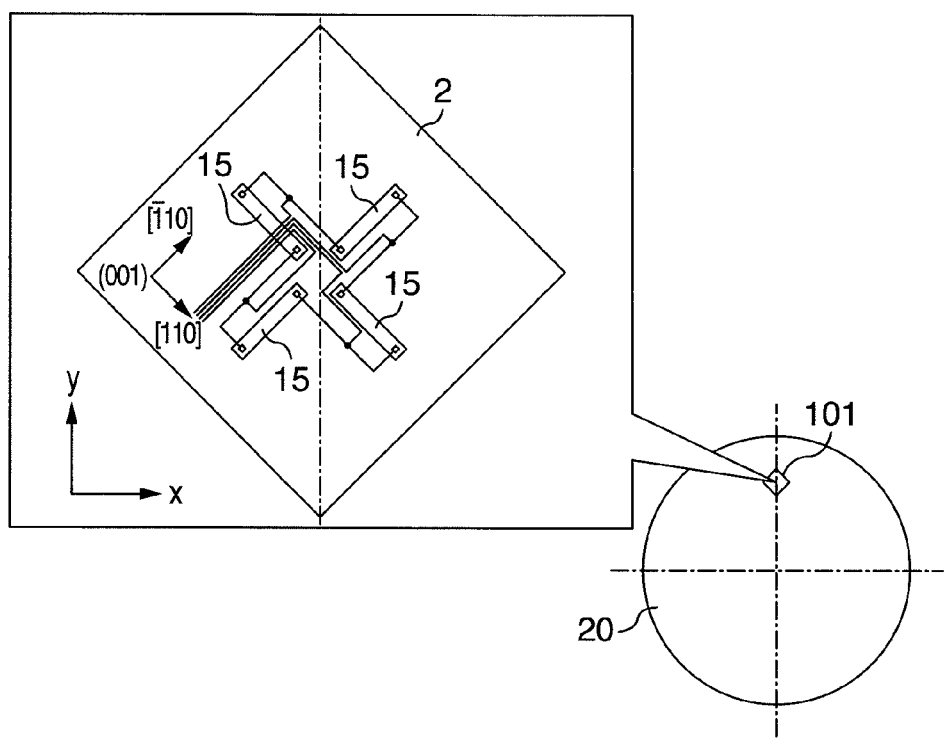
FIG. 29 is a schematic diagram showing how the rotating body dynamic quantity measuring device is bonded according to the diffusion layer arrangement in the embodiment of this invention.
Figure 30:
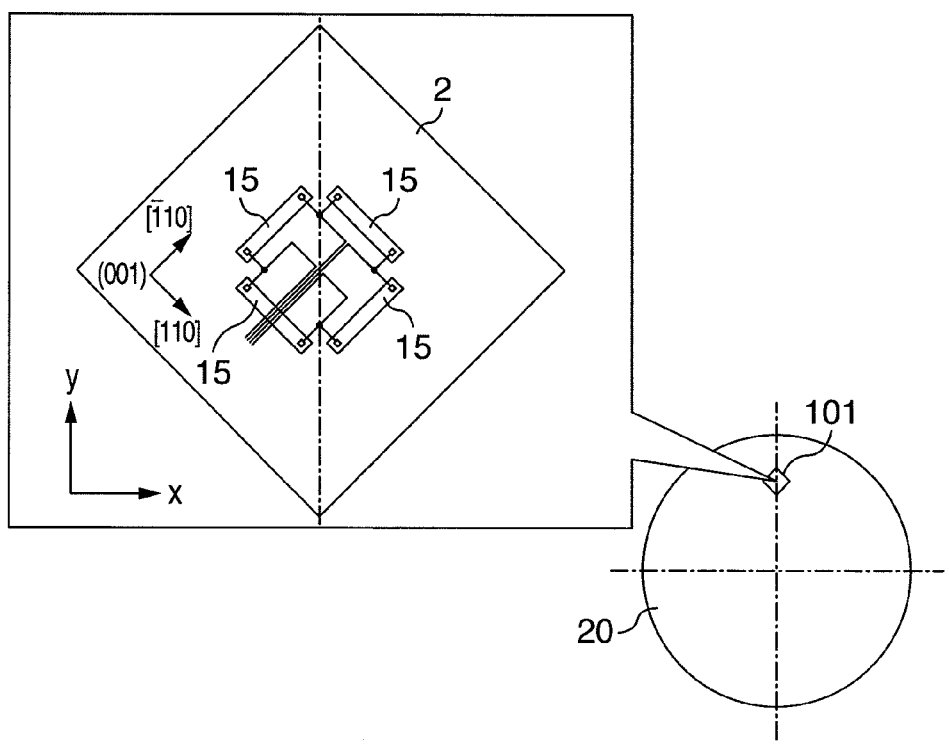
FIG. 30 is a schematic diagram showing how the rotating body dynamic quantity measuring device is bonded according to the diffusion layer arrangement in the embodiment of this invention.
Figure 31:
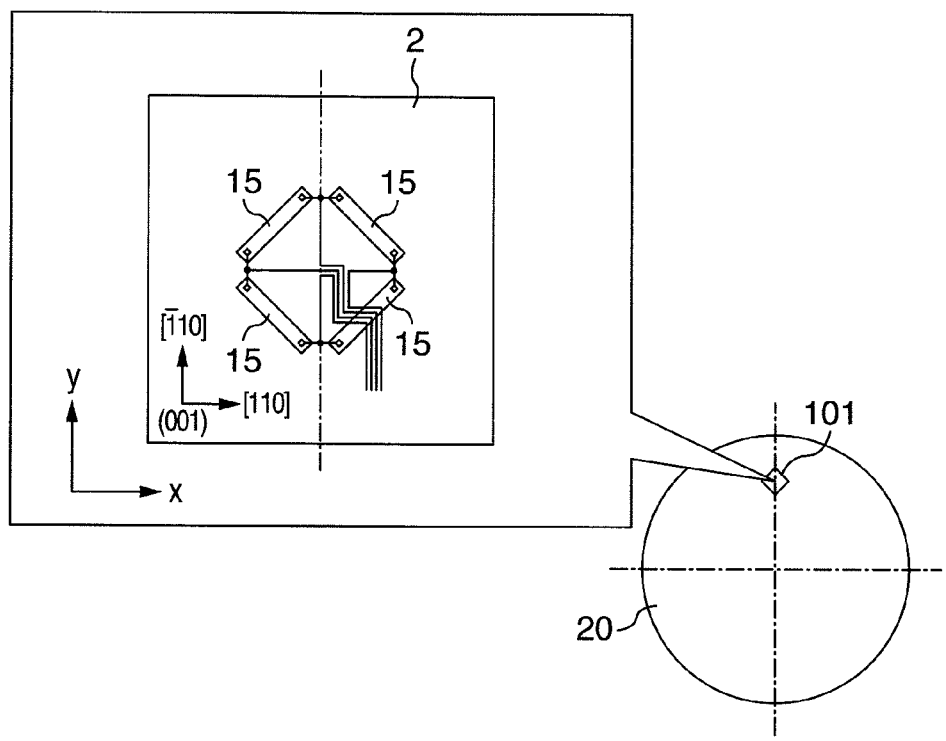
FIG. 31 is a schematic diagram showing how the rotating body dynamic quantity measuring device is bonded according to the diffusion layer arrangement in the embodiment of this invention.
Figure 32:
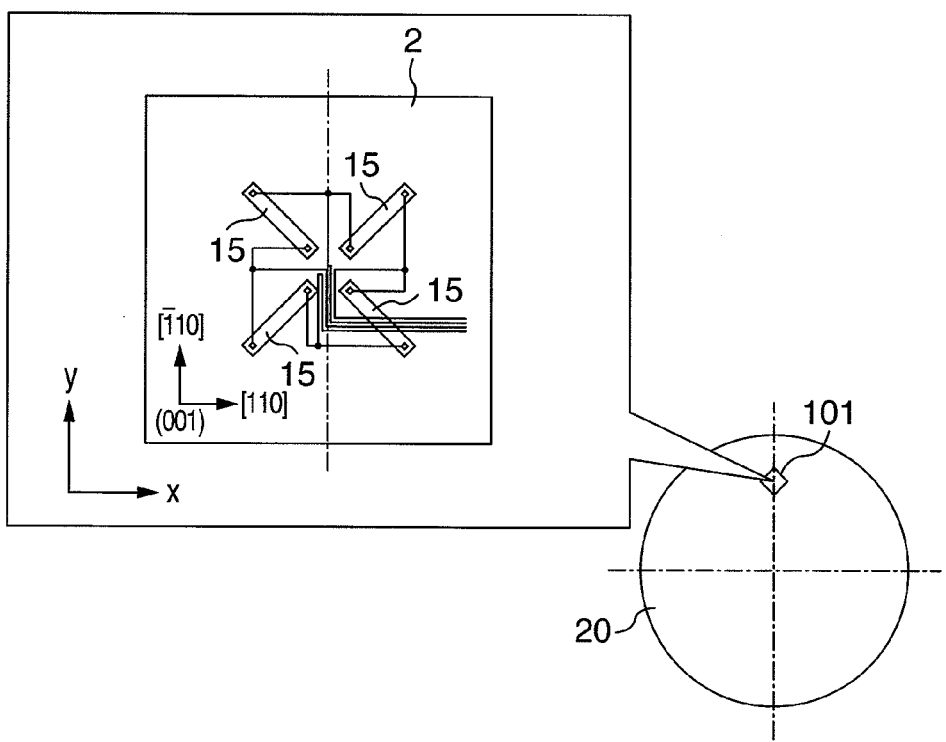
FIG. 32 is a schematic diagram showing how the rotating body dynamic quantity measuring device is bonded according to the diffusion layer arrangement in the embodiment of this invention.

FIG. 17 shows still another rotating body dynamic quantity measuring system according to this invention. This embodiment represents a case where the rotating body is a disk and its shearing strain is measured. The shearing strain of the disk can be measured by the rotating body dynamic quantity measuring device 101 attached to the surface of the disk. In addition to the advantage in the torque measurement of a rotating shaft, this embodiment offers another advantage that since the measuring device 101 is very small, measurements can also be taken if an area of the disk is small. This embodiment is particularly effective where a rotating disk 20 is applied a frictional force by pressing objects 21 against the disk to block its motion. When, for example, the measuring device 101 has a pattern of p-type diffusion layer of FIG. 11, the measuring device is arranged so that the circumferential direction of the disk almost matches the <100> crystal axis of the silicon crystal as shown in FIG. 29 and FIG. 30 and that the longitudinal direction of the diffusion layer is aligned with the <110> direction. If the measuring device 101 has a pattern of n-type diffusion layer of FIG. 12, the measuring device is arranged so that the circumferential direction of the disk almost matches the <110> crystal axis of the silicon crystal as shown in FIG. 31 and FIG. 32 and that the longitudinal direction of the diffusion layer is aligned with the <100> direction.

The present invention can be applied to devices that measure torques of rotating bodies.

Some aspects of the invention will be described in conjunction with the description of embodiments.

Viewed from a first aspect, the present invention provides a rotating body dynamic quantity measuring device comprising: a Wheatstone bridge circuit formed on an element forming surface, namely, a main surface of a single crystal semiconductor substrate, the Wheatstone bridge circuit being constructed of resistors of a p-type impurity diffusion layer; wherein the resistors are so arranged that lines connecting ends of each of half the resistors making up the Wheatstone bridge circuit lie nearly in the same direction as a <110> direction of the single crystal semiconductor and intersect those lines connecting ends of each of the remaining half of the resistors making up the Wheatstone bridge circuit at an angle of between 45 degrees and 135 degrees; wherein, on a back of the single crystal semiconductor substrate opposite the element forming surface, there is no hole greater in width than a shorter side of the p-type impurity diffusion layer forming the Wheatstone bridge circuit.

A second aspect of the present invention provides a rotating body dynamic quantity measuring device comprising: a Wheatstone bridge circuit formed on an element forming surface, namely, a main surface of a single crystal semiconductor substrate, the Wheatstone bridge circuit being constructed of resistors of a n-type impurity diffusion layer; wherein the resistors are so arranged that lines connecting ends of each of half the resistors making up the Wheatstone bridge circuit lie nearly in the same direction as a <100> direction of the single crystal semiconductor and intersect those lines connecting ends of each of the remaining half of the resistors making up the Wheatstone bridge circuit at an angle of between 45 degrees and 135 degrees; wherein, on a back of the single crystal semiconductor substrate opposite the element forming surface, there is no hole greater in width than a shorter side of the n-type impurity diffusion layer forming the Wheatstone bridge circuit.

A third aspect of the present invention provides a rotating body dynamic quantity measuring device comprising: a Wheatstone bridge circuit formed on an element forming surface, namely, a main surface of a single crystal semiconductor substrate, the Wheatstone bridge circuit being constructed of resistors of a p-type impurity diffusion layer; wherein the resistors are so arranged that lines connecting ends of each of half the resistors making up the Wheatstone bridge circuit lie nearly in the same direction as a <110> direction of the single crystal semiconductor and intersect those lines connecting ends of each of the remaining half of the resistors making up the Wheatstone bridge circuit at an angle of between 45 degrees and 135 degrees; wherein, on a back of the single crystal semiconductor substrate opposite the element forming surface, there is no hole greater in depth than half the thickness of the single crystal substrate.

A fourth aspect of the present invention provides a rotating body dynamic quantity measuring device comprising: a Wheatstone bridge circuit formed on an element forming surface, namely, a main surface of a single crystal semiconductor substrate, the Wheatstone bridge circuit being constructed of resistors of a n-type impurity diffusion layer; wherein the resistors are so arranged that lines connecting ends of each of half the resistors making up the Wheatstone bridge circuit lie nearly in the same direction as a <100> direction of the single crystal semiconductor and intersect those lines connecting ends of each of the remaining half of the resistors making up the Wheatstone bridge circuit at an angle of between 45 degrees and 135 degrees; wherein, on a back of the single crystal semiconductor substrate opposite the element forming surface, there is no hole greater in depth than half the thickness of the single crystal substrate.

A fifth aspect of the present invention provides a rotating body dynamic quantity measuring device according to the first aspect, further including: an amplification conversion circuit to amplify signals from the Wheatstone bridge circuit and convert them into digital signals; a transmission circuit to transmit the converted digital signals to an outside of the semiconductor substrate; and a power supply circuit to supply as electricity an electromagnetic wave energy received from outside the semiconductor substrate.

A sixth aspect of the present invention provides a rotating body dynamic quantity measuring device according to the second aspect, further including: an amplification conversion circuit to amplify signals from the Wheatstone bridge circuit and convert them into digital signals; a transmission circuit to transmit the converted digital signals to an outside of the semiconductor substrate; and a power supply circuit to supply as electricity an electromagnetic wave energy received from outside the semiconductor substrate.

A seventh aspect of the present invention provides a rotating body dynamic quantity measuring device according to the first aspect, further including: a conversion circuit to amplify signals from the Wheatstone bridge circuit and convert them into digital signals; a transmission circuit to transmit the converted digital signals to an outside of the semiconductor substrate; and a power supply circuit to supply electricity to these circuits, the electricity being derived from at least one of a sunlight, a temperature difference, an induced electromotive force and a battery received from outside the semiconductor substrate.

An eighth aspect of the present invention provides a rotating body dynamic quantity measuring device according to the second aspect, further including: a conversion circuit to amplify signals from the Wheatstone bridge circuit and convert them into digital signals; a transmission circuit to transmit the converted digital signals to an outside of the semiconductor substrate; and a power supply circuit to supply electricity to these circuits, the electricity being derived from at least one of a sunlight, a temperature difference, an induced electromotive force and a battery received from outside the semiconductor substrate.

An ninth aspect of the present invention provides a rotating body dynamic quantity measuring device according to any one of the first to eighth aspects, wherein the impurity diffusion layer is configured and arranged in nearly a four-time symmetry.

A tenth aspect of the present invention provides a rotating body dynamic quantity measuring device according to any one of the first to eighth aspects, wherein the impurity diffusion layer is configured and arranged in nearly a mirror symmetry.

An eleventh aspect of the present invention provides a rotating body dynamic quantity measuring device according to any one of the first to tenth aspects, wherein a visible marking representing an axial direction or circumferential direction of a rotating shaft is provided on the element forming surface of the semiconductor substrate.

A twelfth aspect of the present invention provides a rotating body dynamic quantity measuring device according to any one of the first to tenth aspects, wherein a bonding portion to be attached to an object being measured is formed on a back of the single crystal semiconductor substrate opposite the main surface.

A thirteenth aspect of the present invention provides a rotating body having a dynamic quantity measuring unit of a rotating body dynamic quantity measuring device attached to a surface thereof, wherein the dynamic quantity measuring unit includes a single crystal semiconductor having an impurity diffusion layer formed in a surface thereof and a back of the single crystal semiconductor opposite the surface formed with the impurity diffusion layer is attached to the rotating body.

A fourteenth aspect of the present invention provides a rotating body according to the thirteenth aspect, wherein the dynamic quantity measuring unit includes a single crystal semiconductor having a p-type impurity diffusion layer formed in a surface thereof and a <100> direction of the single crystal semiconductor formed with the p-type impurity diffusion layer is almost parallel to a rotating axis of the rotating body.

A fifteenth aspect of the present invention provides a rotating body according to the thirteenth aspect, wherein the dynamic quantity measuring unit includes a single crystal semiconductor having an n-type impurity diffusion layer formed in a surface thereof and a <110> direction of the single crystal semiconductor formed with the n-type impurity diffusion layer is almost parallel to a rotating axis of the body.

A sixteenth aspect of the present invention provides a rotating body attached with the rotating body dynamic quantity measuring device of the first, third, fifth, seventh, thirteenth or fourteenth aspect, wherein a rotating axis direction of the rotating body is almost parallel to a <100> direction of the single crystal semiconductor.

A seventeenth aspect of the present invention provides a rotating body attached with the rotating body dynamic quantity measuring device of the second, fourth, sixth, eighth, thirteenth or fifteenth aspect, wherein a rotating axis direction of the rotating body is almost parallel to a <110> direction of the single crystal semiconductor.

A eighteenth aspect of the present invention provides a rotating body dynamic quantity measuring system having a dynamic quantity measuring unit of a rotating body dynamic quantity measuring device attached to a rotating body, wherein dynamic quantity data measured by the dynamic quantity measuring unit and converted into electromagnetic wave information is received by an antenna and a receiving unit to detect the dynamic quantities of the rotating body; wherein the dynamic quantity measuring unit includes a single crystal semiconductor having an impurity diffusion layer formed in a surface thereof and a back of the single crystal semiconductor opposite the surface formed with the impurity diffusion layer is attached to the rotating body.

A nineteenth aspect of the present invention provides a rotating body dynamic quantity measuring system according to the eighteenth aspect, wherein the dynamic quantity measuring unit includes a single crystal semiconductor having a p-type impurity diffusion layer formed in a surface thereof and a <100> crystal axis of the single crystal semiconductor formed with the p-type impurity diffusion layer is almost parallel to a rotating axis of the rotating body.

A twentieth aspect of the present invention provides a rotating body dynamic quantity measuring system according to the eighteenth aspect, wherein the dynamic quantity measuring unit includes a single crystal semiconductor having a p-type impurity diffusion layer formed in a surface thereof and a <110> crystal axis of the single crystal semiconductor formed with the p-type impurity diffusion layer is almost parallel to a rotating axis of the rotating body.

A twenty first aspect of the present invention provides a rotating body dynamic quantity measuring system according to any one of the eighteenth to twentieth aspects, wherein a plurality of rotating body dynamic quantity measuring devices are installed on one rotating shaft.

A twenty second aspect of the present invention provides a rotating body dynamic quantity measuring system according to any one of the eighteenth to twentieth aspects, wherein an antenna is wound around more than half a circumference of a rotating shaft.

A twenty third aspect of the present invention provides a rotating body dynamic quantity measuring system according to any one of the eighteenth to twentieth aspect, wherein a receiving antenna is arranged to cover more than half a circumference of a rotating shaft.

A twenty fourth aspect of the present invention provides a rotating body dynamic quantity measuring system according to the eighteenth aspect, wherein the rotating body is a disk, the dynamic quantity measuring unit includes a single crystal semiconductor having a p-type impurity diffusion layer formed in a surface thereof, and a <100> crystal axis of the single crystal semiconductor formed with the p-type impurity diffusion layer almost matches a circumferential direction of the disk.

A twenty fifth aspect of the present invention provides a rotating body dynamic quantity measuring system according to the eighteenth aspect, wherein the rotating body is a disk, the dynamic quantity measuring unit includes a single crystal semiconductor having an n-type impurity diffusion layer formed in a surface thereof, and a <110> crystal axis of the single crystal semiconductor formed with the n-type impurity diffusion layer almost matches a circumferential direction of the disk.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A rotating body having a dynamic quantity measuring device said dynamic quantity measuring device comprising:
    a Wheatstone bridge circuit having strain sensors and dummy resistors on a [001] surface of a single crystal silicon substrate, wherein
    said strain sensors each comprising an area having p type impurity diffusion layer in the silicon substrate and a longitudinal direction thereof is the same direction as a <110> direction of the silicon substrate, said dummy resistors each comprising an area having p type impurity diffusion layer in the silicon substrate and a longitudinal direction thereof is at 90 degrees to the longitudinal direction of said strain sensor, and
    a <100> crystal axis of said single crystal silicon substrate substantially matches the circumferential direction of said rotating body.

2. A rotating body according to claim 1, wherein a visible marking representing a circumferential direction of said rotating body is provided on an element forming surface of said single crystal silicon substrate.

* * * * *